(12) United States Patent
Aldred

(10) Patent No.: US 12,127,540 B2
(45) Date of Patent: Oct. 29, 2024

(54) FISHING WEED BLOCKER

(71) Applicant: Gregory M Aldred, Saint George, UT (US)

(72) Inventor: Gregory M Aldred, Saint George, UT (US)

( * ) Notice: Subject to any disclaimer, the term of this patent is extended or adjusted under 35 U.S.C. 154(b) by 72 days.

(21) Appl. No.: 18/094,486

(22) Filed: Jan. 9, 2023

(65) Prior Publication Data

US 2024/0224966 A1    Jul. 11, 2024

(51) Int. Cl.
*A01K 85/02* (2006.01)

(52) U.S. Cl.
CPC ............ *A01K 85/02* (2013.01); *A01K 85/022* (2022.02)

(58) Field of Classification Search
CPC .............................. A01K 85/02; A01K 85/022
See application file for complete search history.

(56) References Cited

U.S. PATENT DOCUMENTS

| | | | | |
|---|---|---|---|---|
| 779,744 A * | 1/1905 | Shakespeare, Jr. | .... | A01K 85/02 43/42.51 |
| 1,178,861 A * | 5/1915 | Kruschke | ............... | A01K 85/02 43/42.49 |
| 1,768,033 A * | 6/1930 | Deatz | ...................... | A01K 85/10 43/42.4 |
| 2,074,258 A * | 3/1937 | Fravel | ..................... | A01K 85/02 43/42.49 |
| 2,191,244 A * | 2/1940 | Wise | ....................... | A01K 85/02 43/42.34 |
| 2,241,367 A * | 5/1941 | Sarff | ....................... | A01K 85/02 43/43.15 |
| 2,332,400 A * | 10/1943 | Richardson | ............ | A01K 85/02 43/42.43 |
| 2,663,111 A * | 12/1953 | Hollingsworth | ....... | A01K 85/02 43/42.4 |
| 2,841,913 A * | 7/1958 | Pearson | .................. | A01K 85/02 43/37 |
| 2,955,377 A * | 10/1960 | Appel | ..................... | A01K 85/16 43/42.04 |
| 3,121,969 A * | 2/1964 | Cuttino | ................... | A01K 85/02 43/42.25 |
| 3,151,413 A * | 10/1964 | Witz | ....................... | A01K 85/02 43/42.22 |
| 3,768,194 A * | 10/1973 | Murray | ................... | A01K 85/02 43/42.4 |
| 3,815,274 A * | 6/1974 | Schleif | .................... | A01K 83/00 43/57.1 |

(Continued)

*Primary Examiner* — Jessica B Wong
(74) *Attorney, Agent, or Firm* — David R. Conklin; Kirton McConkie

(57) ABSTRACT

A fishing accessory with capabilities of grabbing and moving weeds or debris to leave more visibility of the fishing lure as it moves through the body of water. A hollowed-bodied fishing apparatus comprising of a main body in the shape of a frustum of a cone, consisting of a small circular top hole and a large circular bottom hole. The holes of the cone are meant to run along a fishing line and held in place by a sinker or weight. The raised lip of the apparatus is to help attach and reinforce the teeth to the main body. The teeth or grabbers are meant to be used as a means of grabbing onto weeds or debris when the apparatus is gliding through the water. This gives the lure or bait a better chance of being clear of weeds and debris

9 Claims, 2 Drawing Sheets

(56) References Cited

U.S. PATENT DOCUMENTS

Figure 1:
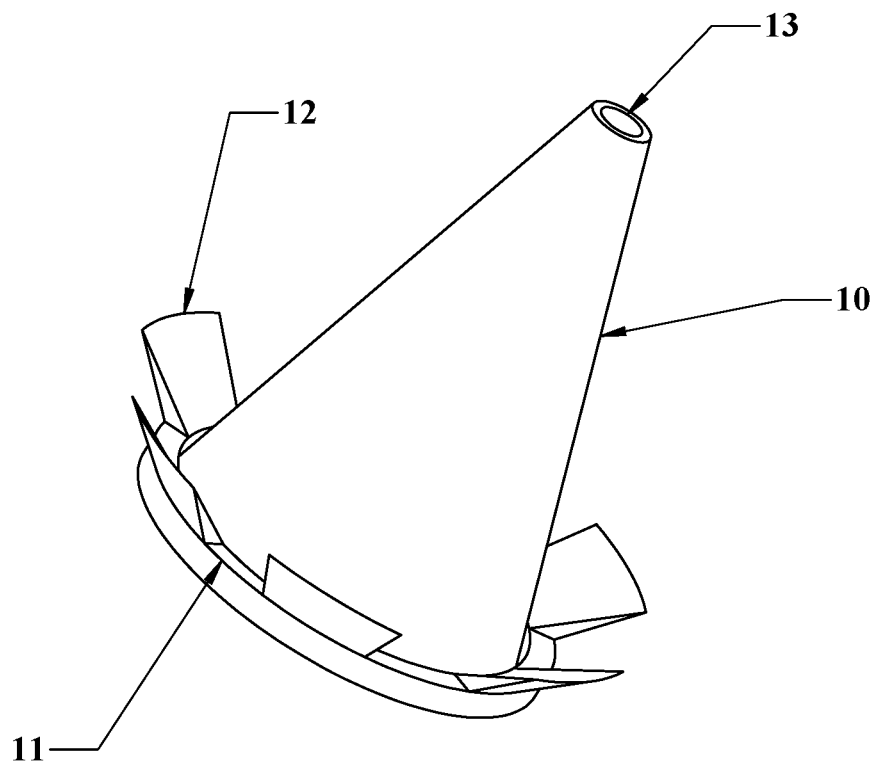

| | | | | | |
|---|---|---|---|---|---|
| 3,908,298 | A | * | 9/1975 | Strader | A01K 85/02 43/42.31 |
| 3,987,576 | A | * | 10/1976 | Strader | A01K 85/10 43/42.31 |
| 4,054,004 | A | * | 10/1977 | Schott | A01K 85/02 43/42.31 |
| 4,163,336 | A | * | 8/1979 | Carpenter | A01K 85/02 43/37 |
| 4,819,361 | A | * | 4/1989 | Boharski | A01K 85/02 43/17.6 |
| 4,914,851 | A | * | 4/1990 | Acker | A01K 85/02 43/42.1 |
| 5,031,350 | A | * | 7/1991 | Rabideau | A01K 85/02 43/43.4 |
| 5,040,325 | A | * | 8/1991 | Herrmann | A01K 85/02 43/42.4 |
| 8,943,738 | B2 | * | 2/2015 | Parcell | A01K 99/00 43/42.4 |
| 9,706,762 | B2 | * | 7/2017 | Parcell | A01K 99/00 |
| 11,497,201 | B1 | * | 11/2022 | Gunness | A01K 85/02 |
| 11,779,001 | B2 | * | 10/2023 | Fox | A01K 91/04 43/42.36 |
| 2007/0033857 | A1 | * | 2/2007 | Myers | A01K 93/00 43/41 |
| 2007/0294934 | A1 | * | 12/2007 | Myers | A01K 93/00 43/41 |
| 2011/0131863 | A1 | * | 6/2011 | Parcell | A01K 99/00 43/41.2 |
| 2014/0360087 | A1 | * | 12/2014 | Klose | A01K 85/12 43/42.26 |
| 2015/0150230 | A1 | * | 6/2015 | Parcell | A01K 91/06 43/4.5 |
| 2023/0049724 | A1 | * | 2/2023 | Fox | A01K 91/04 |
| 2023/0263145 | A1 | * | 8/2023 | Fox | A01K 85/024 43/42.36 |

* cited by examiner

FISHING WEED BLOCKER

BACKGROUND OF INVENTION

The embodiment of disclosure relates to a fishing tackle, more specifically a fishing accessory with the capabilities of grabbing and moving weeds or debris to leave more visibility of the fishing lure as it moves through the body of water, and in addition adding to fish attraction not seen by other fishing accessories. Depending on the application deemed worthy by those skilled in the art, the fishing accessory may be used in multiple variations, including but not limited to a bobber, sinker, and weight.

Fishing tackles are well known in the fishing community. They are found to have constructions, uses, and placements limited to the conception of the anglers. A bobber, for example, is typically fastened to the fishing line a measurable length from the lure and bait. It acts as a floatation device that allows the angler to be aware of a bite and keeps the lure and bait from contacting the ground of the body of water. Other fishing accessories, such as swivels, sinkers, or weights are also widely used. Each of these accessories have variations in size, material, form, function, and means of operation, for it is only limited to the whim of the operator.

Due to the ever-growing menace of waste found in bodied waters, it has proven a challenge to anglers found on inland salt water and freshwater bodies to maneuver around debris and trash that tend to intercept fishing lines. This can result in many issues when fishing, deeming fishing accessories incompetent when meeting head on with debris and trash. Another contributing factor to this issue is weeds; in any bodied water, when not equipped with the correct gear an angler can find himself losing a whole lure and bait system in the tangles of weeds. Altogether, causing visibility issues of the lure and decreasing the likelihood of fish attraction.

There is a need for a durable fishing accessory that has the potential to work in cohesion with added fishing tackles and has the capability to grab and remove weeds and debris from the path of the fishing line, while also giving an air of versatility in terms of operation. The fishing accessory must have the potential to fasten any measurable length up a fishing line and work in a swift motion to remove weeds and debris when the line is jerked, allowing visibility of the lure and bait.

SUMMARY OF INVENTION

An embodiment of the disclosure meets the needs presented above by generally comprising a hollow-body conical fishing accessory with a frustum for the main body, a raised lip, and rectangular prism shaped teeth. The main body is constructed in the form of a frustum of a cone with a thin inner wall lining, consisting of a small circular top hole and a larger concentric bottom hole. The lip lines the outer circumference of the bottom hole of the main body and is raised in direction of the top of the cone. The teeth are in the shape of a rectangular prism, evenly spaced and lined along the top surface of the raised lip, extending out at a sharp angle in comparison to lip. The sharp angle of the teeth allows for an enlarged space between the feature and the main hollowed body. The extension of the teeth outward from the apparatus gives it the capability to grab onto items in application, pulling them closer to the main body to move away in unison. The raised lip acts as a reinforcement to the teeth during application of the force on the embodiment of disclosure.

The apparatus is not limited to the previous description as laid forth, it has the versatility of having multiple operations and assembly possibilities. It can be used in any application of fishing, and is further defined in this scope by those skilled in the art. Nevertheless, there the apparatus has been broadly outlined to include the important features and applications of the disclosure described in coherent detail in accordance thereof to better clarify and assist in the understanding, resulting in a better appreciation of the art as a whole.

The articles of the disclosure, in conjunction with the various features of novelty which characterize the disclosure, are pointed out with deposition in the claims annexed to and forming a part of this disclosure.

BRIEF DESCRIPTION OF SEVERAL VIEWS OF THE DRAWING(S)

Figure 2:
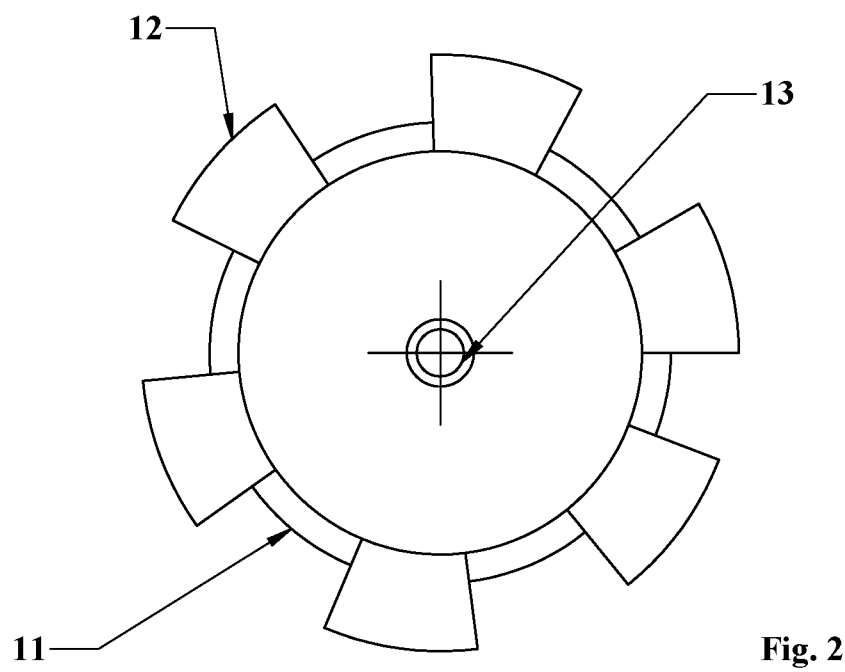
Figure 3:
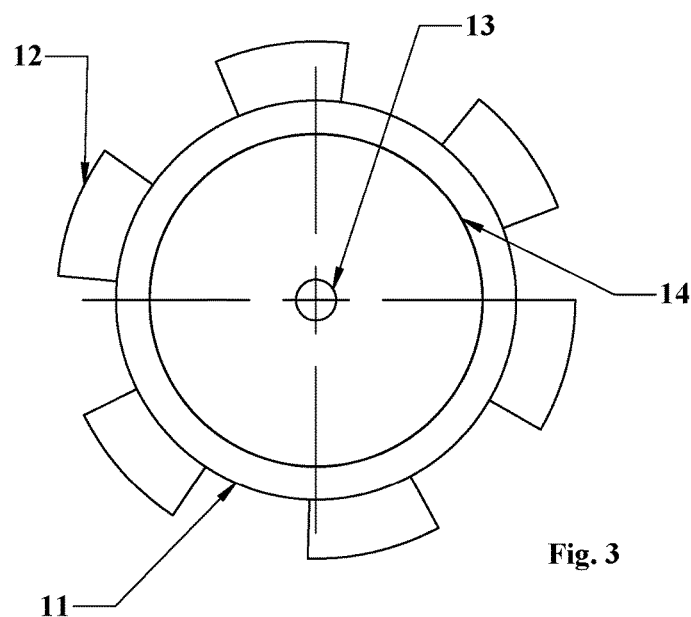
Figure 4:
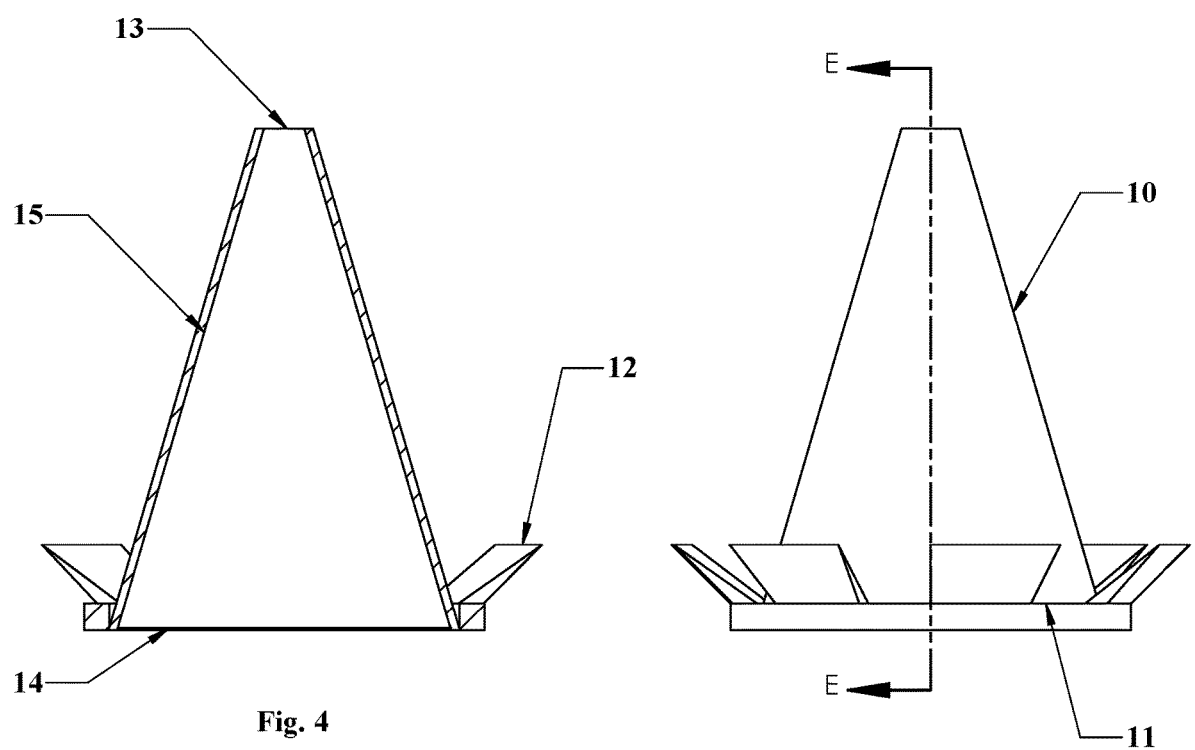

The disclosure will be better understood and objects other than those set forth above will become apparent when consideration is given to the following detailed description thereof. Such description makes reference to the annexed drawings wherein:

FIG. 1 is an isometric view of the fishing accessory apparatus according to an embodiment of the disclosure FIG. 2 is a top view of an embodiment of the disclosure FIG. 3 is a bottom view of an embodiment of the disclosure FIG. 4 is a cross-sectional view along the axis E-E of an embodiment of the disclosure

DETAILED DESCRIPTION OF THE INVENTION

With reference now to the drawings, and in particular to FIGS. 1 through 4 thereof, a new fishing accessory embodying the principles and concepts of an embodiment of the disclosure and generally designated by the reference numeral 10 will be described.

As best Illustrated in the FIGS. 1 through 4 the fishing accessory apparatus in discussion is comprised of a main hollow-body in the shape of the frustum of a cone 10 and at the circumference of the base sits a raised lip 11 this lip contains rectangular-prism shaped teeth or grabber features 12 that are evenly spaced along the lip, pointing out from the main body 10 at a sharp angle.

With the frustum being hollowed the apparatus is comprised of a thin wall 15 a small circular top hole 13 and a large circular bottom hole 14.

The purpose of the hollow-bodied frustum 10 is to allow for the utilization on a fishing line. In application, the fishing line will have a sinker placed at some considerable length up the line, the line will be inserted through the small circular top hole 13 to exit out the larger bottom hole 14, another sinker is to be fastened to sit inside the main body 10 of the embodiment of the disclosure. The usage of the sinker(s) is to allow the apparatus to be submerged underwater once the line has been cast, as well as securing the apparatus in position on the line. The teeth or grabbers 12 are used to pull away and clear the path of weeds or debris, as to leave more visibility of the lure. The raised lip 11 is used as a rigid support system to the teeth 12 to counteract the force of the aforementioned weeds and debris. Also, helping to extend the usage of the embodiment of the disclosure as a whole. Depending on the placement and application of the sinkers, the fishing accessory may also act as a bobber.

The disclosed apparatus is suitably made from 3D-printed plastic polylactic acid, or injection-molded plastics, such as polycarbonate, polystyrene, or others. The scaling and dimensions of the described embodiment may be altered for commercial use.

With respect to the above description then, it is to be realized that the optimum dimensional relationships of the parts of an embodiment enabled by the disclosure, to include variations in size, materials, form, function and the manner of operation, assembly and use, are deemed readily apparent to one skilled in the art, and all equivalent relationships to those illustrated in the drawings and described in the specification are intended to be encompassed by an embodiment of the disclosure.

Therefore, the foregoing is considered as illustrative only for the principles of this disclosure. Further, since numerous modifications and changes will readily occur to those skilled in the art, it is not desired to limit the disclosure to the exact construction and operation described, and accordingly, all suitable modifications and equivalents may be resorted to, falling within the scope of the disclosure. In the patent document, the word "comprised" or "comprising" is used in its non-limiting sense to mean that items following the word are included, but items not specifically mentioned are not included.

I claim:

1. A fishing accessory apparatus, comprising:
a main body in the shape of a frustum of a cone, the main body comprising a top hole, a bottom hole, and a hollow interior extending therebetween;
a raised lip coupled to a base of the main body; and
a plurality of teeth coupled to the raised lip, wherein the teeth extend upwardly from the raised lip and away from the main body such that a gap is provided between the teeth and an outer surface of the main body.

2. The apparatus of claim 1, wherein a diameter of the top hole is configured to receive a fishing line, and to prevent the passage of a sinker or weight coupled to the fishing line.

3. The apparatus of claim 1, wherein the raised lip is rigid.

4. The apparatus of claim 1, wherein the teeth are rectangular prism shaped.

5. The apparatus of claim 4, wherein a base of each of the plurality of teeth has a width that is approximately equal to a width of the raised lip.

6. The apparatus of claim 5, wherein the teeth taper outwardly to a distal edge.

7. The apparatus of claim 1, wherein the teeth are coupled to a top surface of the raised lip.

8. The apparatus of claim 1, wherein the teeth are evenly spaced on the raised lip.

9. The apparatus of claim 1, wherein the teeth are configured to retain weeds and other debris encountered during use of the apparatus.

* * * * *